(12) United States Patent
Hitz et al.

(10) Patent No.: US 8,312,629 B2
(45) Date of Patent: Nov. 20, 2012

(54) METHOD OF MAKING A TUBULAR SUPPORT BAR FOR A DASHBOARD SUPPORT

(75) Inventors: Andreas Hitz, Erwitte (DE); Hans-Jürgen Knaup, Bad Lippspringe (DE)

(73) Assignee: Benteler Automobiltechnik GmbH, Paderborn (DE)

( * ) Notice: Subject to any disclaimer, the term of this patent is extended or adjusted under 35 U.S.C. 154(b) by 939 days.

(21) Appl. No.: 12/168,402

(22) Filed: Jul. 7, 2008

(65) Prior Publication Data

US 2009/0038156 A1 Feb. 12, 2009

(30) Foreign Application Priority Data

Aug. 10, 2007 (DE) .................. 10 2007 038 036

(51) Int. Cl.
*B21C 37/06* (2006.01)
*B21D 9/00* (2006.01)
*B60K 37/00* (2006.01)

(52) U.S. Cl. .......... 29/897.2; 29/33 D; 72/52; 72/367.1; 72/369; 296/193.02

(58) Field of Classification Search .............. 29/897.2, 29/283.5, 33 D; 72/51, 367.1, 368, 369, 72/370.27; 280/798; 296/72, 193.02
See application file for complete search history.

(56) References Cited

U.S. PATENT DOCUMENTS

| | | | | |
|---|---|---|---|---|
| 1,879,078 A * | 9/1932 | Carlsen | ........................... | 72/368 |
| 4,148,426 A * | 4/1979 | Midzutani et al. | ............. | 228/146 |
| 4,971,239 A * | 11/1990 | Tyler et al. | ................... | 228/146 |
| 5,119,552 A * | 6/1992 | Sutou et al. | ............... | 29/890.052 |
| 5,924,316 A * | 7/1999 | Streubel et al. | .................... | 72/51 |
| 6,391,470 B1 | 5/2002 | Schmieder et al. | | |
| 6,643,931 B2 * | 11/2003 | Nees | .......................... | 29/897.312 |
| 6,877,652 B2 * | 4/2005 | Ooyauchi et al. | .............. | 228/170 |
| 6,915,617 B2 * | 7/2005 | Nees et al. | ..................... | 296/202 |
| 7,407,221 B2 * | 8/2008 | Kring et al. | .............. | 296/193.02 |
| 7,484,298 B2 * | 2/2009 | Mellas et al. | ................. | 29/897.2 |
| 7,503,622 B2 * | 3/2009 | Vican | ....................... | 296/190.03 |
| 2002/0130533 A1 * | 9/2002 | Hartel et al. | .................. | 296/187 |
| 2005/0206184 A1 * | 9/2005 | Fischer | .......................... | 296/72 |
| 2005/0257591 A1 * | 11/2005 | Hauger et al. | .................. | 72/368 |
| 2006/0075920 A1 * | 4/2006 | Streubel | ......................... | 105/396 |
| 2006/0096099 A1 * | 5/2006 | Cripsey et al. | ............... | 29/897.2 |
| 2007/0035118 A1 * | 2/2007 | Ni et al. | ........................ | 280/797 |
| 2007/0180697 A1 * | 8/2007 | Knaup | .......................... | 29/897.2 |
| 2007/0235113 A1 * | 10/2007 | Knaup | .......................... | 148/643 |
| 2011/0198873 A1 * | 8/2011 | Perarnau Ramos et al. | .. | 293/133 |

FOREIGN PATENT DOCUMENTS

| | | |
|---|---|---|
| DE | 299 16 470 U1 | 1/2000 |
| DE | 103 59 746 B4 | 7/2005 |
| EP | 0 990 578 B1 | 2/2002 |
| WO | WO 2006/042032 | 4/2006 |

* cited by examiner

*Primary Examiner* — Alexander P Taousakis
(74) *Attorney, Agent, or Firm* — Henry M. Feiereisen, LLC

(57) ABSTRACT

In a method of making a tubular support bar for a dashboard support, a sheet metal blank is placed in a first forming tool and pressed in a first shaping step by a ram into a U-shaped cavity of a first bottom die to form a U-shaped member. While remaining in the first bottom die, the U-shaped member is provided with connecting elements in the form of weld nuts by a automated placement device. Subsequently, the U-shaped member is transferred to a second forming tool and undergoes a second shaping step between a top die and a second bottom die to form a slotted tube. The longitudinal edges of the slotted tube are then joined together to form the support bar.

8 Claims, 3 Drawing Sheets

METHOD OF MAKING A TUBULAR SUPPORT BAR FOR A DASHBOARD SUPPORT

CROSS-REFERENCES TO RELATED APPLICATIONS

This application claims the priority of German Patent Application, Serial No. 10 2007 038 036.6, filed Aug. 10, 2007, pursuant to 35 U.S.C. 119(a)-(d), the content of which is incorporated herein by reference in its entirety as if fully set forth herein.

BACKGROUND OF THE INVENTION

The present invention relates to a method of making a tubular support bar for a dashboard support.

Nothing in the following discussion of the state of the art is to be construed as an admission of prior art.

Dashboard supports find application in motor vehicles as load-bearing structure for various cockpit functions. A main component of the dashboard support is the crossbeam which extends between the windshield pillars transversely to the travel direction and imparts stiffness to the vehicle body. The crossbeam is normally made of one or more support bars. Various functions are assumed by the dashboard support. Besides stiffening the vehicle body for absorbing energy in the event of a crash, the dashboard support is also intended to connect various spatial points and to secure various mountings. Moreover, the dashboard support should be suitable for operation in different frequency ranges because various vibrations are encountered during travel, caused by the chassis or motor for example.

Various mountings are arranged on the crossbeam for the instrument panel as well as for holding and attachment of further functional components of the vehicle, such as steering column, heating and air conditioning unit, airbag, center console, fuse box, or glove compartment. To hold these functional vehicle components and their mounts, perforations, holes or embossments are made in the crossbeam to provide attachment points which are sometimes provided for connecting elements, such as nuts or bolts. The subsequent placement of connecting elements is not only time-consuming but also costly.

It would therefore be desirable and advantageous to address this problem and to obviate other prior art shortcomings.

SUMMARY OF THE INVENTION

According to one aspect of the present invention, a method of making a tubular support bar for a dashboard support includes the steps of placing a sheet metal blank in a forming tool, pressing the blank in a first shaping step into a U-shaped cavity of a first bottom die to form a U-shaped member, providing the U-shaped member with connecting elements in the first bottom die, shaping the U-shaped member in a second shaping step between a top die and a second bottom die to form a slotted tube, and joining longitudinal edges of the slotted tube.

The present invention resolves prior art problems by integrating the provision of the connecting elements while the blank is shaped into the U-profile, so that the need for later setting of connecting elements is eliminated or at least substantially eliminated. As a result, manufacturing costs are decreased. In addition, further separate manufacturing steps such as perforating or embossing of the support bar as well as upsizing or recessing of tube ends or bending of the support bar can be eliminated or at least largely reduced. Examples of connecting elements include various nuts such as pierce nuts, weld nuts, studs or the like. The connecting elements are incorporated and attached into the U-shaped member by means of an automated placement device.

A support bar made in accordance with the present invention may form per se the crossbeam of the dashboard support to extend between the windshield pillars, also called A-pillars, of the vehicle body. It is, of course, also possible to combine a support bar according to the invention with other support bars or components in order to form the crossbeam. The support bar is then disposed within the crossbeam on the driver side and/or passenger side of a dashboard support.

The support bar receives a spatial cross sectional configuration during shaping operation in the forming tool. The bottom dies may hereby be configured to produce rectangular cross sections with flat surfaces, whereas the support bar receives at the upper half a bulbed or rounded cross sectional profile.

In general, the sheet metal blank may be perforated before being shaped into a U-profile. It is, however, also conceivable to perforate the U-shaped member in the bottom die. This is especially suitable, when providing the U-shaped member with spatially curved zones. Perforation may be implemented with separate punching tools or together with the provision of the connecting elements.

In accordance with the present invention, the support bar may also be formed with varying cross sectional configurations. By providing the bottom die with a suitable configuration, the support bar may be formed with a freely selectable cross sectional profile in axial and radial directions. In particular, the support bar can be provided with a spatially curved cross sectional profile with arched sections.

According to another feature of the present invention, the support bar may also be formed with flat surface areas that can be provided in the second bottom die.

According to another feature of the present invention, areas of the support bar may also be provided with reinforcement plates to control the strength and stiffness behavior. The reinforcement plates may be joined with the U-shaped member before the blank is finally shaped to assume the tubular support bar configuration. It may also be possible to provide areas of the flat sheet metal blank with reinforcement plates before the blank is formed to a U-shaped configuration.

A support bar made in accordance with the present invention may be used as a single-piece structure between the A-pillars of a motor vehicle. As an alternative, it may also be possible, to make a short support bar in accordance with the invention for combination with further components in order to produce the complete crossbeam. Of course, two or more support bars made in accordance with the present invention may also be combined to form a crossbeam.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
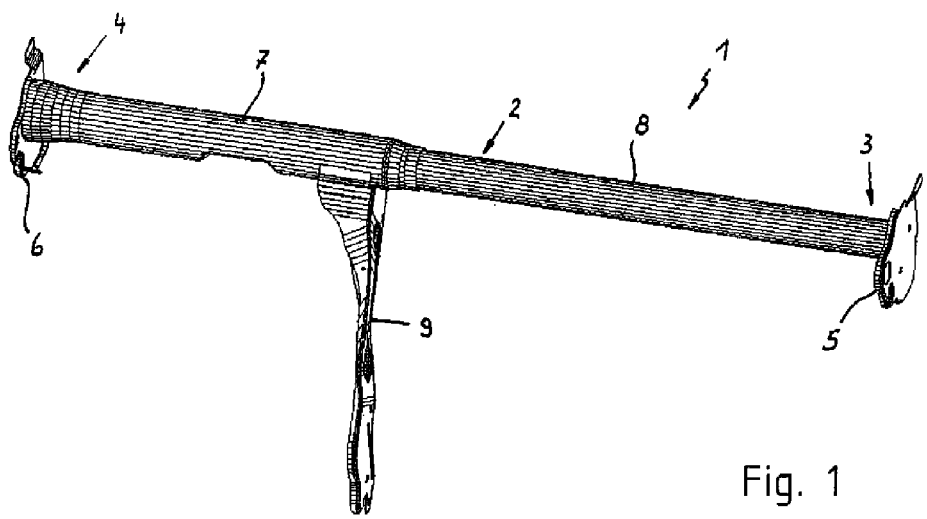
FIG. 1 is a perspective view of a dashboard support.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a perspective view of a dashboard support, generally designated by reference numeral 1 and including a crossbeam 2 extending between unillustrated A-pillars of a motor vehicle. The crossbeam 2 has opposite ends 3, 4 which are provided with flanges 5, 6, respectively. The dashboard support 1 can be secured via the flanges 5, 6 to the A-pillars of a body of motor vehicle.

The crossbeam 2 is composed of two support bars 7, 8. The support bar 7 has varying cross-sectional profiles and spans the driver side of a motor vehicle, while the support bar 8 is formed from a tube with constant diameter. The support bars 7, 8 are joined together approximately in midsection of the crossbeam 2. The bar 7 is further provided with a mounting 9 for securement of a center console.

Figure 2:
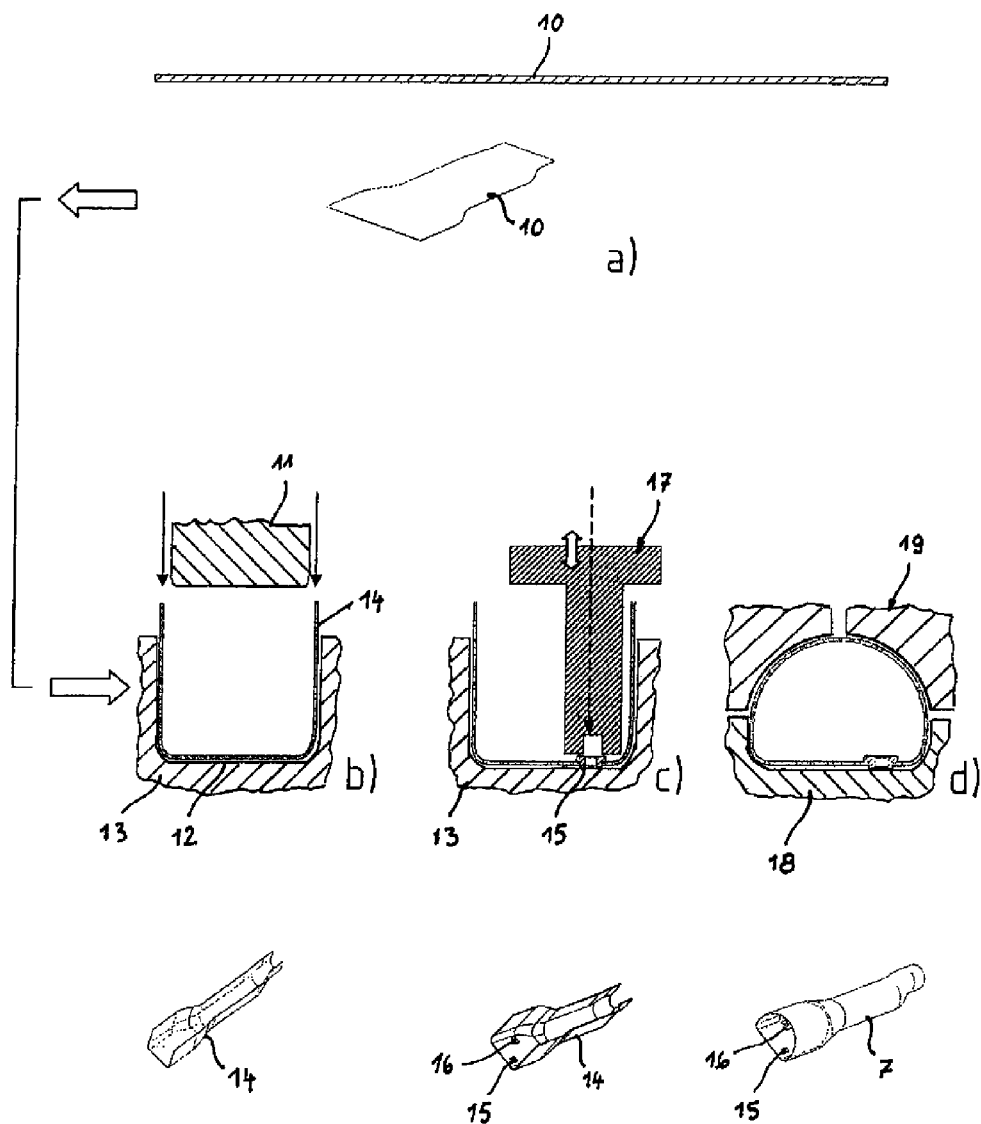
FIG. 2 is a schematic illustration of successive method steps a)-d) for manufacturing a support bar according to the present invention.

Referring now to FIG. 2, there is shown a schematic illustration of successive method steps a)-d) for manufacturing the support bar 7. For convenience and the sake of simplicity, the manufacturing method will be described hereinafter only with respect to the support bar 7 but it will be appreciated by persons skilled in the art that the description is equally applicable to the manufacture of support bar 8. It will also be understood by persons skilled in the art that the described manufacturing method according to the invention covers also the manufacture of a single-piece support bar for a crossbeam to extend from one A-pillar to the other A-pillar.

Starting product is a sheet metal blank 10 which is reeled off a coil and cut to size and optionally trimmed, as shown in FIG. 2*a*. FIG. 2*a* shows the blank 10 by way of a side view and by way of a perspective view on a smaller scale. If desired, the blank 10 may be perforated before executing the shaping procedure.

The blank 10 is placed in a first forming tool and pressed in a first shaping step by a ram 11 into a U-shaped cavity 12 of a bottom die 13 to form a U-shaped member 14. This is shown in FIG. 2*b*, with the lower illustration depicting a perspective view of the U-shaped member 14, on a much smaller scale. The U-shaped member 14 has a varying cross sectional profile along its length, with flat surface areas and curved sections. It will be appreciated by persons skilled in the art that the ram 11, cavity 12 and the bottom die 13 are shown in FIG. 2*b* in a greatly simplified manner.

Following the first shaping step, the U-shaped member 14, while still retained in the bottom die 13 is provided with connecting elements 15, 16, as shown in FIG. 2*c*. The connecting elements 15, 16 involved here are pierce nuts which are incorporated and secured in the U-shaped member 14 by an automated placement device 17. Of course, other connecting elements such as bolts or studs and the like may also be automatically set. The lower illustration of FIG. 2*c* depicts a perspective view of the placed connecting elements 15, 16 in the U-shaped member 14 on a much smaller scale.

The U-shaped member 14, provided with the connecting elements 15, 16, is then transferred to a second forming tool comprised of a bottom die 18 and a top die 19. After being placed in a second bottom die 18, the U-shaped member 14 is shaped in a second shaping step to a slotted tube between the top die 19 and the bottom die 18. During shaping operation, the confronting longitudinal edges of the U-shaped member 14 support one another until the final configuration has been fully established. Then, the longitudinal edges of the U-shaped member 14 are joined together, e.g. by welding, to form the support bar 7. FIG. 2*d* shows the support bar 7 by way of a vertical cross section and underneath by way of a perspective illustration on a smaller scale.

Figure 3:
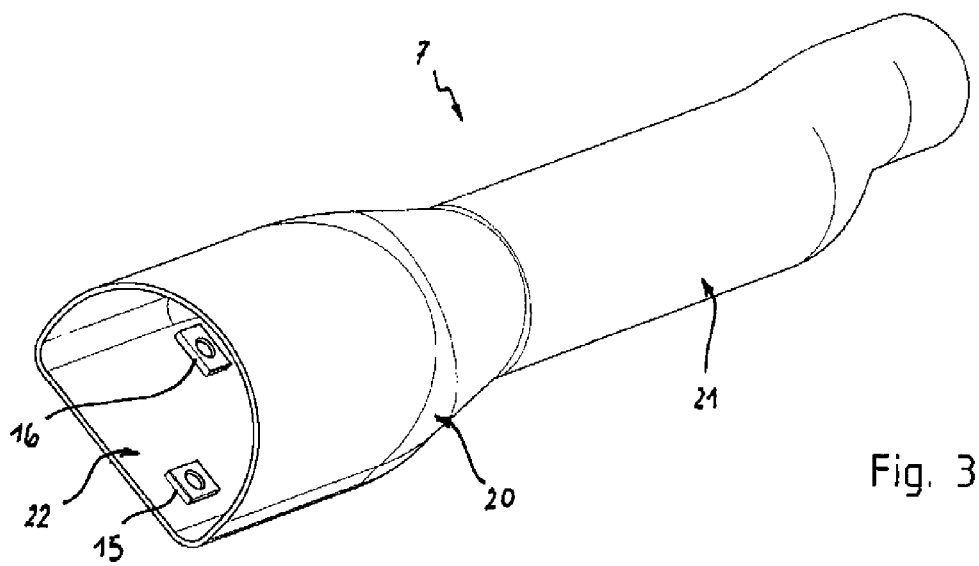
FIG. 3 is a top perspective view of the support bar.
Figure 4:
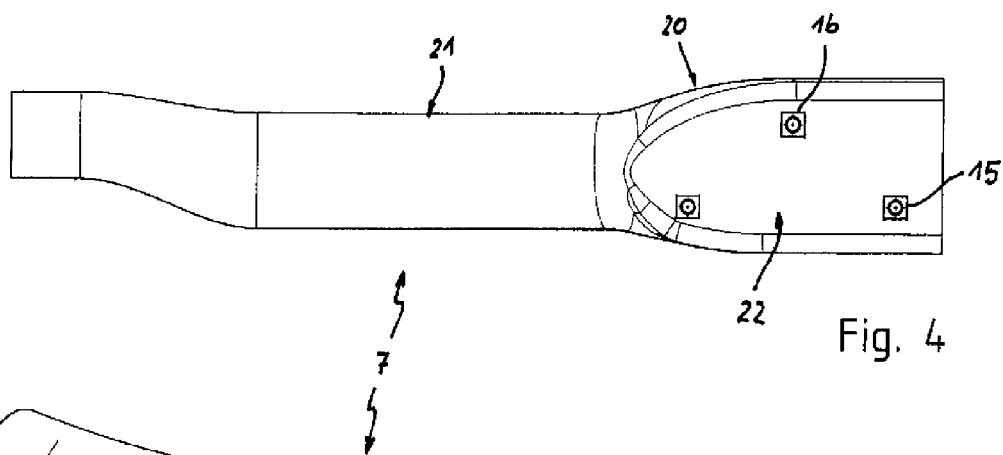
FIG. 4 is a bottom view of the support bar.
Figure 5:
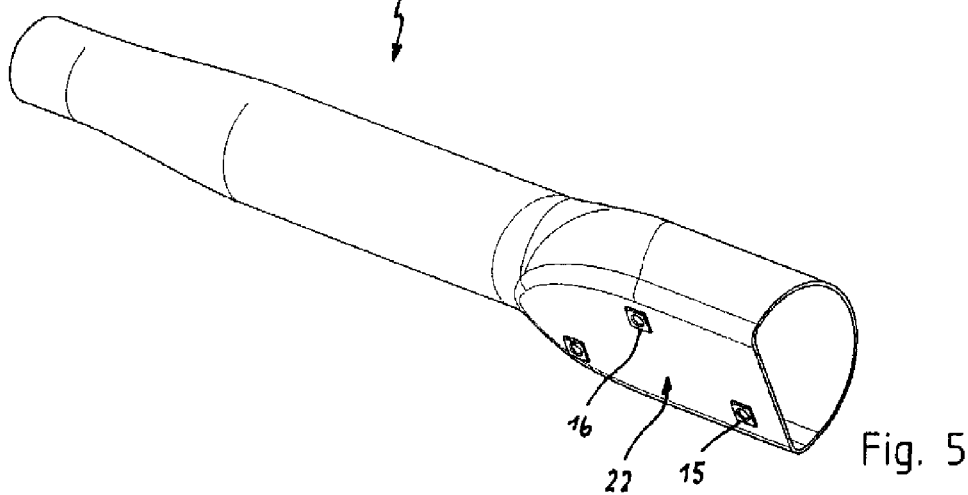
FIG. 5 is a bottom perspective view of the support bar.

The support bar 7 is shown in greater detail by various views depicted in FIGS. 3, 4 and 5. As can be seen, the support bar 7 has portions 20, 21 of different cross sectional configurations with a cross section profile that varies in axial and radial directions. In addition, the support bar 7 is formed with a flat surface area 22 that has been established while the U-shaped member 14 is formed in the bottom die 13 of the first forming tool. The connecting elements 15, 16 are provided in the flat surface area 22.

Figure 6:
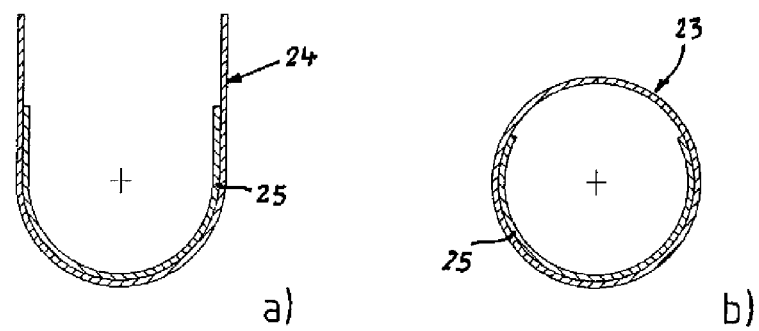
FIG. 6 is a schematic illustration of two successive method steps a)-b) for manufacturing another embodiment of a support bar according to the present invention.

Turning now to FIG. 6, there is shown a schematic illustration of two successive method steps a)-b) for manufacturing another embodiment of a support bar according to the present invention, generally designated by reference numeral 23. The support bar 23 is generally manufactured in a same way as previously described with reference to support bar 7, whereby a sheet metal blank is first placed in a bottom die of the first forming tool and shaped into a U-shaped member 24, including connecting elements which have not been shown here for the sake of simplicity.

Areas of the support bar 23 are stiffened by reinforcement plates 25, whereby the reinforcement plates 25 may be attached to the blank before the blank is shaped to form the U-shaped member 24. After attaching the reinforcement plates 25, the blank is forced by a ram into the U-shaped cavity of the bottom die of the first forming tool to form the U-shaped member 24. Of course, it is also conceivable, to provide the U-shaped member 24 with reinforcement plates 25 after the first shaping step has been carried out.

The U-shaped member 24 provided with the reinforcement plates 25 is then shaped in a second shaping step between a top die 19 and a bottom die 18 of the second forming tool to form the tubular support bar 23, whereby the longitudinal edges are joined together.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein.

What is claimed is:

1. A method of making a tubular support bar for a dashboard support, comprising the steps of:
    placing a sheet metal blank in a forming tool;
    pressing the blank in a first shaping step into a U-shaped cavity of a first bottom die to form a U-shaped member;
    providing the U-shaped member in the first bottom die with at least one threaded connecting element spaced inwardly from an axial end of the U-shaped member;
    shaping the U-shaped member in a second shaping step between a top die and a second bottom die to form a slotted tube; and
    joining longitudinal edges of the slotted tube.

2. The method of claim 1, further comprising the step of perforating the U-shaped member in the first bottom die.

3. The method of claim 1, further comprising the step of forming the support bar with areas of different cross section.

4. The method of claim 1, wherein the pressing step includes the step of forming the U-shaped member with at least one flat surface area in the first bottom die.

5. The method of claim 1, further comprising the step of reinforcing at least one area of the U-shaped member with a reinforcement plate.

6. The method of claim 1, further comprising the step of reinforcing at least one area of the blank with a reinforcement plate before the pressing step.

7. The method of claim 1, further comprising the step of perforating the blank before the pressing step.

8. The method of claim 1, wherein the at least one threaded connecting element is provided in a flat surface area of the U-shaped member.

* * * * *

UNITED STATES PATENT AND TRADEMARK OFFICE
CERTIFICATE OF CORRECTION

PATENT NO. : 8,312,629 B2
APPLICATION NO. : 12/168402
DATED : November 20, 2012
INVENTOR(S) : Andreas Hitz et al.

It is certified that error appears in the above-identified patent and that said Letters Patent is hereby corrected as shown below:

Title Page, Item (56) References Cited: Please add patent document U.S. 7,637,135.

Signed and Sealed this
Twelfth Day of March, 2013

Teresa Stanek Rea
*Acting Director of the United States Patent and Trademark Office*